Nov. 28, 1961 R. D. PEARSON 3,010,491
WIRE COILING MACHINE
Filed June 13, 1958 3 Sheets-Sheet 1
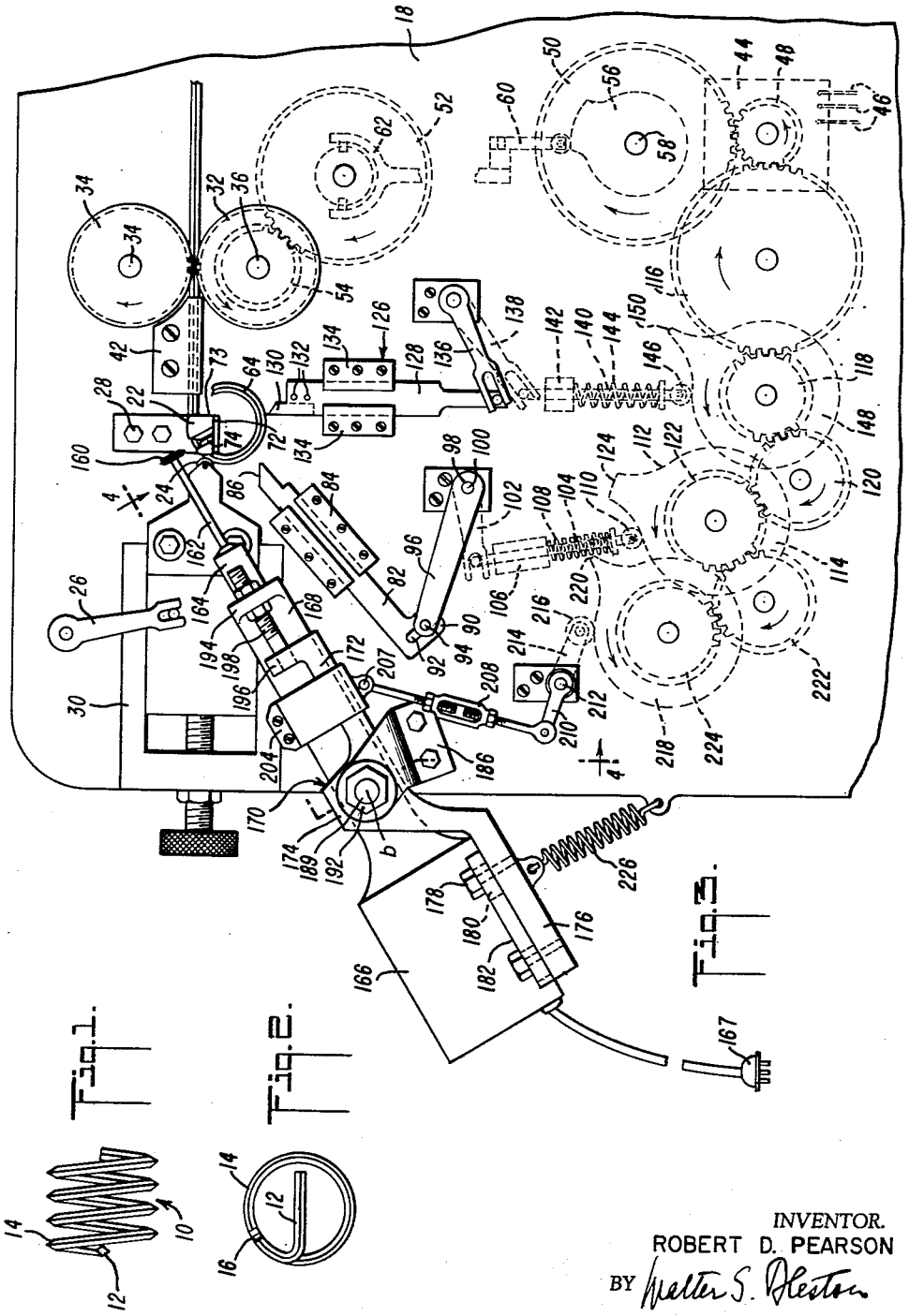
INVENTOR.
ROBERT D. PEARSON
BY Walter S. Pleston
ATTORNEY

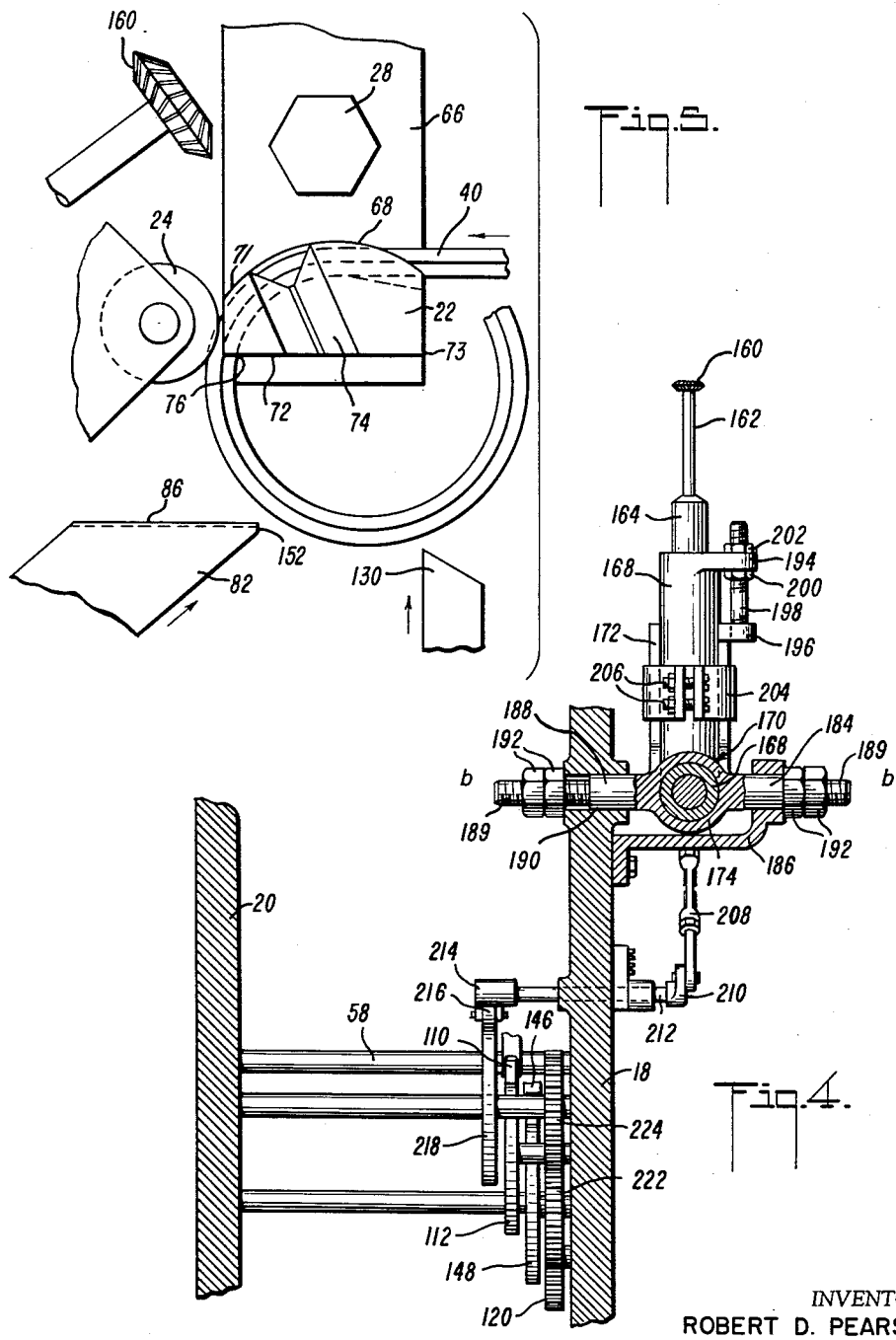

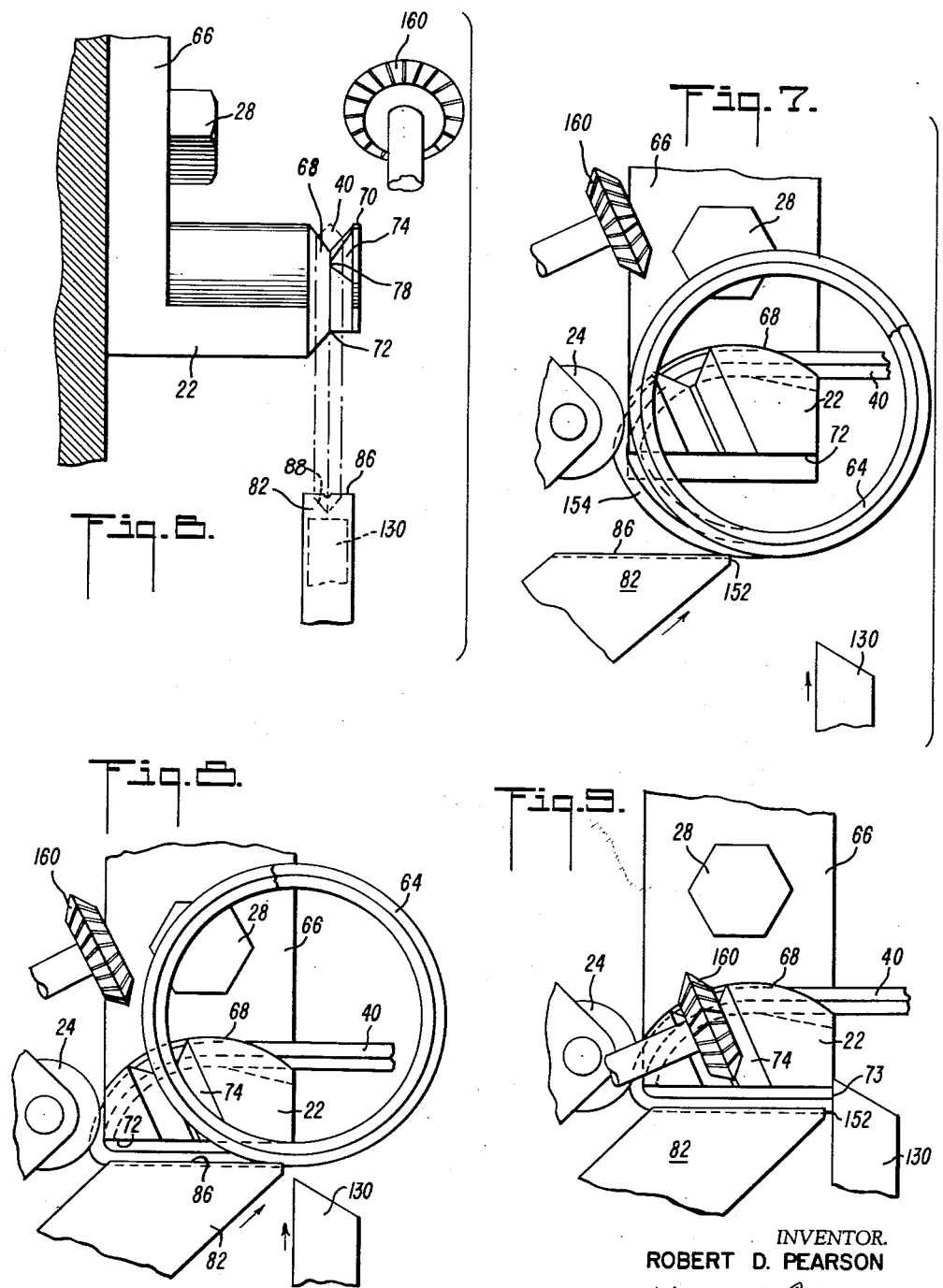

United States Patent Office 3,010,491
Patented Nov. 28, 1961

3,010,491
WIRE COILING MACHINE
Robert D. Pearson, Brookfield, Conn., assignor to Heli-Coil Corporation, Danbury, Conn., a corporation of Delaware
Filed June 13, 1958, Ser. No. 741,803
9 Claims. (Cl. 140—88)

The invention relates to a wire coiling machine of the arbor and coiling point type as described e.g. in Patent 2,393,804 to Nigro. This patent discloses a machine for forming coils with a substantially diametrical tang straightened from an originally coiled convolution wherein the tang is connected to the coil body, in some instances, by a convolution or part of a convolution of a diameter gradually increasing from the tang to the body of the coil. Coils of that type are frequently used as screw thread inserts particularly if the wide cross section is of a shape having an outer portion with converging flanks as e.g. a wire of a substantially pear-shaped or diamond shaped cross-section.

In the conventional machine according to the mentioned patent, a wire stock is fed during a predetermined portion of a cycle of operation whereupon during a shorter period in which the feeding is stopped, the tang is formed by urging a convolution portion while still coherent with a precedingly formed coil against a substantially straight face of the arbor and cutting the tang where the precedingly formed coil coheres with it. The tang-forming and cutting is accomplished by a combined tool which moves in an arcuate path intersecting the path of a coil convolution which has just passed between the arbor and the coiling point. Thereby the tool urges a portion of that coil convolution against a co-operating tang-forming face of the arbor. However, the conventional tool has the drawback that the portion of the coil convolution which is to be engaged by the tang-forming part of the tool is first engaged by the cutting edge of the tool which not only scratches that coil portion but also starts to cut into it even before the cutting edge of the tool is in a position for co-operation with a stationary cutting edge of the arbor. This operation results in a marred coil portion and an unclean cut of the tang end and of the opposite end of the precedingly formed coil, necessitating secondary trimming operations on both the end of the preceding coil and the end of the tang.

The invention aims, therefore, to provide means whereby in a coiling machine of the mentioned type, first a tang-forming instrumentality engages the coil portion to be formed into a tang and presses it against a face of the arbor, whereupon a cutter cooperates with an arbor edge to sever the tang while it is firmly clamped between that arbor face and that instrumentality.

Another object of the invention is the provision of a tang former separate from the cutter whereby the tang former is capable of making precisely shaped, straight tangs allowing close tolerances in a tool destined to engage a tang for the application of a coil.

The invention further aims to provide a tang-forming tool for co-operation with a predetermined arbor face, and a cutter for co-operation with an arbor edge at that end of the arbor face which is the rear end considering the direction of movement of the wire during the tang-forming, wherein the tang-forming tool is reciprocal in a straight line inclined with respect to that arbor face and having a directional component towards the mentioned rear end, and wherein the cutter is reciprocal in a straight line towards and away from the arbor edge and is operative after said tang-former has substantially completed its working stroke.

Another object of the invention is the provision of a tang-former and cutter of the mentioned type wherein the tang-former presses and retains the formed tang against the arbor face during the return stroke of the cutter whereby the cutter cannot drag or lift the previously severed tang end from the arbor face, as it frequently happens with the well-known machines.

If a coil with a tang so formed is to be used as a screw thread insert, the tang serves as a grip for an inserting tool. However, in many instances, particularly if the coil is used to line a through-going hole, the tang must be removed after the insertion so as to permit a free passage of a screw bolt. In order to facilitate the removal of the tang, it is a conventional expedient to provide a notch in the coil portion adjacent the tang. Hitherto, however, the notching of the coil was a time and work consuming, costly operation, because the coil otherwise finished on the coiling machine had to be gripped by hand and clamped between jaws in the correct position while a notch-forming instrumentality, such as a file or milling cutter, had to be moved across the coil convolution at the proper point.

It is another object of the present invention to provide means for notching a coil during its production.

According to another object of the invention, the notching takes place after the forming of the tang but during the same cycle period of stopped feeding in which the tang is formed. In the preferred mode of operation, the notch forming tool is operative after a preceding coil has been cut off the tang.

Another object of the invention is, for the indicated purpose, the provision of a milling cutter guided in an arcuate path across the coil convolution adjacent the tang while the tang is still clamped between the arbor and the tang-forming tool.

Another object of the invention is the provision of a notching instrumentality guided in a path across the coil convolution engaging the arbor while the tang is still clamped to it, wherein the arbor is grooved in order to permit the mentioned instrumentality to notch the wire to a desired depth.

Further objects and details of the invention will be apparent from the following description and the accompanying drawing showing an embodiment thereof by way of example. In the drawing:

FIGS. 1 and 2 are side elevation and front view, respectively, of a wire coil produced on the machine according to the invention, FIG. 3 is a diagrammatical front elevation of a machine for producing coils according to FIGS. 1 and 2, the tang-forming, cutting and notching tools being in their inactive position, FIG. 4 is a section along line 4—4 of FIG. 3, FIG. 5 is a front elevation on a larger scale of the arbor with a wire during the coiling while the tang-former, cutter and notcher are inoperative, FIG. 6 is a side elevation of the parts shown in FIG. 5, the wire being shown in dash and dot lines, FIG. 7 is an illustration similar to FIG. 5, the tang-former beginning to urge a convolution against the co-operating face of the arbor, FIG. 8 illustrates the completion of the tang-formation, cutter and notching tool being inoperative, and FIG. 9 shows the end position of the tools, the preceding coil having been cut off and the notch being completed.

Referring now to the drawing, the illustrated coiling machine is of the conventional coiling-point-and-arbor type. Only those parts of the machine are shown which have a direct bearing on the present invention. Other parts of the conventional machine are disclosed in the above mentioned U.S. Patent No. 2,393,804 to Nigro.

In the accompanying drawing, FIGS. 1 and 2 illustrate a wire coil constituting a screw thread insert for the production of which the machine according to the invention is destined. Although a coil is shown of a wire having a diamond shaped cross-section, it will be apparent from the following description that coils of other cross-sections may be made as well on this machine. The coil illustrated in FIGS. 1 and 2 is denoted in general by 10. The machine according to the invention is destined not only to wind a coil but also to provide it with a substantially diametrical tang 12 at one of its ends and, furthermore, to provide the front surface of the convolution 14 adjoining the tang with a substantially radially directed notch 16 of a desired depth up to about half the wire thickness.

The machine for producing coils such as 10 is illustrated in FIGS. 3 and 4. It has a front wall 18 and a rear wall 20. The arbor 22 and coiling point 24 with parts such as 26 of the adjusting mechanism may be attached to the front side of the front wall 18 in the conventional manner and by conventional means as indicated for the arbor by screw bolts 28 and for the coiling point by the frame 30. Also on the front side of wall 18 two feed rollers 32 and 34 are journaled at 36 and 38 respectively, at opposite sides of the wire 40 which they pull from the stock (not shown) and push through a guide 42 towards the arbor 22 in the direction of the arrow a. At least one of the rollers which in FIG. 3 is the roller 32 is power driven. The drive comprises an electric motor 44 supplied with current by leads 46 from a source not shown. Only parts of the transmission between the motor 44 and roller 32 are shown and comprise gears 48, 50, 52 and 54. A cam disc 56 is secured to the same shaft 58 with the gear 50 so as to actuate periodically a follower 60 which controls the operating fork 62 of a clutch (not shown) of the type illustrated in the above mentioned patent and which serves to interrupt the feeding of the wire during a period of the production cycle of a coil 10. It will be understood that the parts shown in dash lines in FIG. 3 may be arranged between the front wall 18 and rear wall 20 of the machine. During the feeding period of the cycle of the machine operation, the coil forms between the arbor 22 and coiling point 24, in the manner indicated at 64. The pitching tool conventionally applied to the machine and which serves to provide for a desired pitch of the coil convolutions has not been shown in order to avoid overcrowding of the drawing.

The arbor 22 is more clearly illustrated in the enlarged FIGS. 5 and 6. It is shown as securely attached to the front wall 18 by a flat, upwardly directed extension 66 and the aforementioned screw bolts 28. The arbor is provided with an arcuate peripheral grooved surface portion 68 to receive thereon the wire 40 and to cooperate with the coiling point 24 in the formation of the coil 64. Beginning at the entrance end of the groove 68 a flange 70 ensures the proper running of the wire on the arbor. Following the portion 68 in the direction of the wire movement, a substantially straight, approximately diametrically directed surface portion 72 serves for forming the coil tang 12 (FIGS. 1 and 2) in cooperation with a tang-forming tool which will be described hereinafter. The surface 72 ends in a sharp cutting edge 73, also for co-operation with a tool to be described later on for the purpose of severing a finished coil from a subsequent tang. So far as herein described with reference to the foregoing, the arbor is of a conventional form except that in some instances the arbor is not fixedly attached to the front wall of the machine but adjustable for special purposes in the axial and or peripheral direction as disclosed e.g. in the U.S. Patent 2,170,984 to Bergevin. Hence, it will be clear that an adjustable arbor may be substituted for the fixedly attached arbor which, however, in any event, may be readily exchangeable for another one if a coil of different features is to be produced. In order to serve a particular purpose of the present invention, as it will be explained later on, the front face of the arbor is provided with a substantially V-shaped approximately radial groove 74 extending from the straight surface 72 to the arcuate surface 68 at some distance from the point 76 where the arcuate surface portion adjoins the straight portion. The groove 74 is so deep that its bottom 78 reaches as far as about half the thickness of a wire 40 on the arbor. Depending on the size of the wire, the flange 70 may be continued by a flange piece 71 extending between the groove 74 and point 76. Particularly for larger wire sizes it is advisable to provide the flange piece 71 whereas for the smaller sizes the piece may be omitted.

It is a specific feature of the present invention that both the tools for forming the tang and for severing the latter from a precedingly finished coil are reciprocal in straight-lined paths, but that they move independently from, although in a timed relationship, to each other. The tang-forming tool 80 comprises a pusher rod 82 shiftable lengthwise in guides 84 in a direction inclined with respect to the arbor face 72 so that this direction has one component at right angles and another component parallel to that arbor face, wherein the parallel component is directed towards the cutting edge 73. The upper end 86 of the pusher rod is parallel to the surface 72 and grooved according to the cross-section of the wire to be coiled, e.g. V-shaped as indicated at 88 in FIG. 6, where the wire is indicated in dotted lines. Means are provided to operate the tang-forming tool in timed relationship to the other members of the coiling machine. For this purpose, the pusher rod 82 has a lower fork-shaped end 90 with an elongated slot 92 into which the end 94 of a lever 96 engages which is fulcrumed at 98 on the outside of the wall 18. The axle 100 of lever 96 extends through the wall and carries on the inside of wall 18 another lever arm 102 which is secured to the axle and engages a cam follower 104. The follower 104 is guided at 106 and so biased by a spring 108 that it tends to pull the lever arms 102 and 96 and with them the push rod 82 down into its illustrated inoperative end position in which the follower roller 110 rides on the circular portion 112 of a cam disc 114. The cam 114 may be permanently rotated by the motor 44 via the train of gears 48, 116, 118, 120, 122, provided the transmission ratio of the gears is such that the cam crest 124 of the cam 114 acts on the follower only during the non-feeding period of a cycle of the machine operation, i.e. during the period the fork 62 holds the aforementioned clutch disengaged. The cam crest 124 when raising the follower 104 will shift the pusher rod 82 into its highest operative position shown in FIG. 8, and the rod 82 will return to its lowermost inoperative position shown in FIGS. 3 and 5 when the roller 110 rolls down the slope of the crest 114.

The tool for severing the tang from a preceding coil is in general denoted by 126. It comprises a holder 128 for a knife blade 130 secured to the holder by means such as screws 132. The holder 128 is guided by means indicated at 134 on a straight-line path substantially at right angles to the arbor surface 72 and so directed that the blade 130 can cooperate with the edge 73 in severing a finished tang. The holder 128 can be reciprocated by means similar to those disclosed with respect to the tang-forming tool, i.e. an outer lever 136 engages the lower end of the holder and an inner lever 138 engages a follower 140 which is provided with guiding means 142, a spring 144 and a roller 146 at its foot end. The roller 146 follows the contour of the cam disc 148 which has a crest 150 and is connected to the aforementioned gear 118 for common rotation. Thus, the total 128, 130 will be operated in accordance with the rotation of the cam. Now it will be noted, first that the gears 118 and 122 have the same diameter and are both in mesh with the gear 120 and, therefore, rotate synchronously, second that the crests 124 and 150 are so located in relation to each other that roller 110 will have reached the top of crest 124 before roller 146 reaches the crest 150, and third, that the peripheral extension of crest 124 is rather large whereas the top of the crest 150 is hardly more than a point. In consequence, the formation of the tang will have been completed before the tang is severed by the blade 130 and the severing will occur while the completed tang is still firmly clamped between the arbor surface 72 and the top 86 of the pusher rod 82. This feature ensures a clean cut which was not attainable in the conventional machine of a similar type. It is also to be noted that the formation of the tang takes place free from any interference by the severing tool which otherwise might cause scratches or burrs on the formed tang or the preceding coil end.

The operation of the tools is illustrated in FIGS. 5, 7, 8 and 9. FIG. 5 shows the tools in the same position as FIG. 3 in which the coil 64 is formed while the operative tool portions 86 and 130 are inactive and spaced from the coil, i.e. the convolution portion directly leaving the arcuate arbor face 69.

When now roller 110 starts to climb the slope of the cam crest 124, pusher rod 82 moves upward and its edge 152 begins to push the last mentioned coil portion, denoted by 154 in FIG. 7, towards the arbor face 72 whereby the coil 64 is shifted somewhat to the right hand side. The blade 130 has not yet moved appreciably as roller 146 has reached only the very lowermost portion of the slope of cam crest 150. From now on, however, the two tools move simultaneously upwards until the tang-forming tool has reached its topmost position, as in FIG. 8, in which it clamps the tang 12 against the arbor surface 72 whereas the blade 130 is still spaced from the wire.

While, then, the tang-forming tool stays in this position, blade 130 continues to move upwards to the position of FIG. 9, in which the precedingly finished coil, owing to the cooperation of the blade 130 and arbor edge 73, is severed from the tang of the subsequent coil and has fallen off. The tool 130 may now return to its initial position of rest immediately whereas the tool 82 may still remain in the position of FIGS. 8 and 9 for a purpose which will be explained hereinafter.

In addition to the tang-forming and severing tool, the machine according to the invention comprises means to provide the notch 16 in a coil 10 in the interval during which in a cycle of operation the feeding of wire is stopped in order to form the tang and to sever the preceding coil. For this purpose the mentioned interval may or may not be somewhat extended depending on the timing of the operations of the different elements of the machine.

Various types of tools and modes of their operation are conceivable for the purpose of providing the notch. Preferably, however, a high speed rotary tool may be used and reciprocated across the wire portion which is on the arcuate arbor face 68 while the wire feeding is stopped. In the illustrated embodiment, the proposed structure is illustrated in FIGS. 3 and 4. A rotary cutter disc 160 is secured with its shaft 162 to an axial extension 164 of the rotor of an electric motor 166 which has its separate plug 167 and may rotate permanently during the operation of the machine. The extension 164 is rotatable in an extension 168 of the motor housing. A holder 170 encompasses the extension 168, at least partly, with its front end portion 172 and completely with a tubular median portion 174. The rear end 176 of the holder is shaped as a platform to which the motor 166 is secured by screws 178 passed through elongated holes 180 in the motor foot 182. The median holder portion 174 is provided with an outer stub axle 184 journaled in a detachable bearing 186 and with an inner stub axle 188 journaled in a bearing 190 in the wall 18. For a purpose to be explained hereinafter, the ends of the stub axles 184 and 188 may have each a screw threaded extension 189 with nuts 192 abutting against the bearings 186 and 190 respectively. The foremost end of the extension 168 is provided with a lug 194. A similar lug 196 of the front holder end registers with the lug 194 and carries a threaded stud 198 which is passed through a hole in lug 194 and on which nuts 200 and 202 are screwed, as shown. Now it will be clear that an adjustment of the rotary cutter is possible in the axial direction by first loosening the screws 178 then projecting or retracting the motor housing in relation to the holder 172 by correspondingly turning the nuts 200 and 202 and then tightening the screws 178. Similarly, an adjustment in the direction of the stub axles 184 and 188 is possible by properly loosening and tightening the nuts 192. By reciprocating the unit of the cutter 160 and motor 166 with extension 168 and holder 172 about the axis b—b of the stub axles, the cutter 160 can be conducted across the wire on the arcuate arbor face 69 and engage the arbor groove 74 so as to cut a notch 16 as deep as approximately half the wire thickness. The parts 194 to 202 render it possible finely to adjust the path of the cutter 160 so that it accurately registers with the arbor groove 74. The groove 74 may but need not be cut as an arc about the axis b—b because the length of the groove in relation to the radius of the reciprocation of the cutter 160 is such that the difference between the groove as a chord and the corresponding arc is negligible. Of course, it is also possible to take care of any such difference if so desired by making the groove slightly wider than the thickness of the cutter disc. Whereas in the manner just described the cutter path and arbor groove can be caused to register exactly, the adjustability of the cutter-motor unit in the direction of the axis b—b allows for a setting of the cutter so that a notch 16 of any desired depth can be provided.

The holder 172 and cutter 160 can be further secured to each other in an adjusted position by a clamp 204 tightened by screws 206 about the holder 172 and extension 168. Simultaneously, clamp 204 is the element through which a reciprocating movement is imparted by the driving parts to the cutter. For this purpose the clamp 204 is provided with an eye 207 into which the upper end of a connecting organ engages. This organ is or contains a turnbuckle 208. Its lower end is linked to a lever arm 210 the shaft 212 of which passes through the wall 18 and carries on the inside of the latter another lever arm 214 with a roller 216 at its free end. Roller 216 constitutes the follower of a cam 218 with crest 220. The cam 218 is driven from the aforementioned gear 122 through other gears 222 and 224, the diameter of the latter being of the same size as that of gear 122. It is to be noted that the crest 220 of cam 218 is of a shape similar to that of the crest 150 which operates the severing tool, but crest 220 is so positioned that roller 216 reaches the top of the crest only after roller 146 has reached the top of the crest 150 and preferably also while roller 110 is still on the crest 124 of cam 114. When roller 216 rises on the slope of crest 220, the cutter 160 will swing downward in the clockwise direction to perform a notching operation. When roller 216 has passed the crest, the weight of the motor 166 with or without the aid of a spring 226 tensioned between platform 176 and wall 18, will outbalance the parts on the right hand side of the axis b—b so that the cutter 160 will return to its upper end position.

FIGS. 5 to 9 further illustrate how the cutter 160 moves in relation to the wire on the arbor and to the movement of the tang-forming and severing tools. The sequence of movements is defined by the positions of the cam crests 124, 150 and 220, as hereinbefore described. At the beginning of any movement of the tools, the cutter is in the position of FIG. 5. The first tool to move is the tang former 82. When this tool reaches the position of FIG. 7, the cutter 160 may have either not yet started to move or only very slightly. In the position of FIG. 8, the cutter 160 has approached the arbor without, however, having yet started to notch because the preceding coil 64 is still in the way of the cutter 160 although the tang 12 is already firmly clamped. Only after the coil 64 has been severed and has fallen off as in FIG. 9, cutter 160 will also have completed its working stroke and will now be located in the arbor groove 74, however only so far that it does not cut into the tang 12. This requirement, although not necessarily being complied with under all circumstances, limits the size of the cutter in relation to the size of the arbor or of the coil to be produced. Thus, it will be clear that in the end position, when cutter 160 has just cleared the wire portion on the arcuate arbor face 69, it must not yet come into contact with the tang. This exact end position can be adjusted by means of the turnbuckle 208. The more this is lengthened, the farther away from tang 12 will the cutter be located in its end position. On the other hand, of course, the cutter must come down sufficiently to cut wholly across the total width of the arcuate wire portion. It will be understood that the notching cutter 160 with its motor and accessorial parts may be designed as a permanent attribute of a coiling machine or as a detachable attachment of a machine of the conventional coiling point and arbor type.

As stated hereinbefore, the novel elements according to the present invention operate during an intermission between two wire-feeding periods in the formation of coils. In timed relationship to the other elements, first the tang-forming tool 80 starts to operate by being shifted upwards by the cam follower 104. The tang former pushes the finished coil to the right hand side and simultaneously stretches a coil portion along the straight arbor face. Shortly after the tang-forming tool has begun to move, the severing tool also begins to rise due to the follower 140 being shifted upwards by the cam crest 150. The blade 130 cuts into the wire not before the tang is firmly clamped by the tang-forming tool. The severing tool immediately returns to its initial position after it has completed its working stroke. The notching cutter begins its working stroke after the tang-forming tool and is so timed that it begins the notching after the preceding coil is out of the way, i.e. is severed from the tang and has fallen off. During the operation of the notching cutter, the tang is clamped and preferably is still clamped until the cutter 160 has cleared the arcuate wire portion on its return stroke. Feeding of the wire may start again immediately thereafter when the tools, performing their return strokes, have freed the way for the coiling of the wire.

It will be apparent to those skilled in the art that many alterations and modifications of the structure shown and described will be possible without departure from the essence and spirit of the invention which for that reason shall not be limited but by the scope of the appended claims.

I claim:

1. In a wire coiling machine of the type described including an arbor and a coiling point, said arbor having a substantially straight peripheral face subsequent to an arcuate face in the direction of the wire movement and a cutting edge at the end of the straight face, said faces being lengthwise grooved for the reception of the wire to be coiled and the bottoms of said grooves being in one plane, the combination of a reciprocal tool having a face for cooperation with said straight arbor face to form a substantially diametrical tang, first guiding means for said tang-forming tool so as to impart to the latter a straight-lined movement slanting in relation to said straight arbor face so that said movement has one component directed at right angles towards said straight arbor face, and another component parallel to said straight face and directed towards said edge, a first driving means to reciprocate said tang forming tool thereby to urge a precedingly coiled wire portion against said straight arbor face and to form a tang, a reciprocal cutting tool adapted to cooperate with said arbor edge to cut a formed tang, second guiding means for said cutter to cause a straight movement thereof substantially at right angles to said straight arbor face, a second driving means to reciprocate said cutter, and means so to time said second driving means in relation to said first one that said cutter starts severing said tang after the completion of the formation of the latter.

2. A device as in claim 1, further comprising a notching tool, means to reciprocate said tool in a path intersecting a portion of the wire to be coiled while said wire portion engages said arcuate arbor face and said precedingly coiled wire portion is urged by said tang-forming tool against said straight arbor face so as to clamp the wire onto said arbor for notching, said path having a direction substantially radial with respect to said arcuate arbor face and being located in a plane parallel to said plane of said groove bottoms, and said notching tool being operative through said wire portion to a depth from the front side of said arbor to substantially half the thickness of said wire.

3. In a machine of the arbor and coiling point type described including a stationary arbor to receive thereon consecutive portions of a wire stock to be coiled, said arbor having a peripheral arcuate face, a straight face in continuation of said arcuate face and substantially diametrical with respect thereto, a cutting edge at the free end of said straight face, and a substantially flat front face, said arcuate face being provided with a first peripherally extending groove into which said wire portions can be curved, said straight face being provided with a second groove in continuation of said first groove and into which a portion of a curved wire portion can be straightened to form a tang, and said front face being provided with a third groove substantially radial with respect to said first groove and having a bottom substantially in one plane with the bottoms of both the other grooves, a tang-forming tool for cooperation with said second groove, a cutter to cooperate with said edge, a notching tool reciprocal on a path coinciding with the direction of said third groove and adapted to notch a curved wire portion located and held in said first groove, said notching tool having one end position when engaging said third groove between said first and said second grooves and another end position spaced from said arbor on the convex side of said arcuate face, means to actuate said tang-forming tool, and other means to actuate said cutting tool and said notching tool while said tang-forming tool holds the formed tang in said second groove.

4. A device as claimed in claim 3, said notching tool being a milling cutter having a diameter so small that when in said first mentioned end position said milling cutter does not cut into the wire portion located in said second groove, said milling cutter being reciprocal about a pivot axis at right angles to the plane of said front face of said arbor and being so far spaced from said pivot axis that its arc when passing across said arcuate arbor face appears to be practically straight lined and being rotatable about a second axis parallel but spaced from said plane in front thereof so as to notch the front of the wire portion on said arcuate arbor face.

5. A device as claimed in claim 3, said notching tool being a milling cutter, said device further comprising an electric motor coaxially coupled with said milling cutter so as to form a unit, a holder for said unit reciprocal about a pivot having an axis at right angles to the plane of said arbor front face, and means effective between said unit and said holder for adjusting the spacing of said milling cutter from said axis.

6. A device as claimed in claim 5, further comprising means for adjustably changing the position of said holder in the direction of its pivot axis thereby to adjust the depth of the notch to be cut.

7. A device as claimed in claim 5, further comprising driving means for reciprocating said holder about its pivot, said means including a lengthwise adjustable means for adjusting said first end position.

8. In a wire coiling machine of the type described including a stationary arbor having an arcuate face to receive thereon consecutive portions of a wire stock to be coiled, and a straight face substantially diametrically directed and adjoining said arcuate face, said arbor being provided with a first peripheral groove in said arcuate face to locate the wire on said arbor and with a second groove in a front face of said arbor and extending substantially radial in respect to said arcuate face on the concave side thereof between said arcuate and said straight faces, said second groove cutting in said first groove and reaching in depth substantially as far as the bottom of said first groove, a tang-forming tool adapted to urge and clamp a coil portion precedingly formed on said arcuate arbor face against said straight face thereby to form said tang, a milling cutter notching tool reciprocal on a path coinciding with the direction of said second groove and adapted to notch a wire portion located and held in said first groove, said notching tool having one end position when engaging said second groove and being located between wire portions on both said arcuate and straight faces, respectively, and another end position spaced from said arbor on the convex side of said arcuate face, means to actuate said tang-forming tool and another means to reciprocate said notching tool while said tang-forming tool is clamping said formed tang against said straight face.

9. An attachment to a wire coiling machine of the coiling-point-and-arbor type for notching, during an intermission of the coiling, a wire portion located and held in a peripheral groove in an arcuate face of the arbor which is provided in its front face with a second groove substantially radial with respect to said peripheral groove, said attachment comprising a substantially disc-shaped milling cutter rotatable about a first axis and adapted for lengthwise engagement in said second groove after having notched said wire portion, a motor to which said milling cutter is coaxially coupled so as to constitute a cutter and motor unit, a holder for said unit, said unit being axially shiftable for adjustment in said holder, said holder including a pivotal axle intermediate said cutter and said motor and having a second axis at right angles to said first axis, a bearing to journal therein said axle, said bearing including means to secure said bearing to said machine, said holder being axially shiftable in said bearing, first means to reciprocate said cutter about said second axis between two end positions along a path substantially coinciding with the lengthwise extension of said second groove, second means to secure said unit in said holder as to its axial position which is adjustable to change the radius of the arc through which said cutter is swingable, third means to secure said holder in said bearing as to its axial position which is adjustable to change the depth to which the milling cutter is operating, and a fourth means included in said first means adjustable to change the location of at least one of said end positions.

References Cited in the file of this patent
UNITED STATES PATENTS

| | | |
|---|---|---|
| Re. 24,345 | Bergevin | Aug. 20, 1957 |
| 369,851 | Haselton | Sept. 13, 1887 |
| 1,336,501 | Blanckensee | Apr. 13, 1920 |
| 1,563,465 | Breitenstein | Dec. 1, 1925 |
| 1,728,672 | Mascuch | Sept. 17, 1929 |
| 1,756,427 | Gunter | Apr. 29, 1930 |
| 2,119,002 | Bergevin | May 31, 1938 |
| 2,187,791 | Lipps | Jan. 23, 1940 |
| 2,201,658 | Whitney | May 21, 1940 |
| 2,393,804 | Nigro | Jan. 29, 1946 |
| 2,510,820 | Hermanson | June 6, 1950 |
| 2,662,289 | Giffen | Dec. 15, 1953 |
| 2,701,016 | Bedson | Feb. 1, 1955 |
| 2,754,580 | Schlaich | July 17, 1956 |
| 2,851,862 | Lohman | Sept. 16, 1958 |